(12) United States Patent
Heckmann et al.

(10) Patent No.: US 7,269,762 B2
(45) Date of Patent: Sep. 11, 2007

(54) METHOD FOR MUTUAL MONITORING OF COMPONENTS OF A DISTRIBUTED COMPUTER SYSTEM

(75) Inventors: Hans Heckmann, Karlsruhe (DE);
Reinhard Weiberle, Vaihingen/Enz (DE); Bernd Kesch, Hemmingen (DE); Peter Blessing, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 10/446,296

(22) Filed: May 28, 2003

(65) Prior Publication Data
US 2004/0034810 A1    Feb. 19, 2004

(30) Foreign Application Priority Data
May 29, 2002 (DE) ................. 102 23 880

(51) Int. Cl.
*G06F 11/00* (2006.01)
(52) U.S. Cl. .......................... 714/47; 701/29
(58) Field of Classification Search ............. 714/47; 702/148; 701/29, 46
See application file for complete search history.

(56) References Cited

U.S. PATENT DOCUMENTS

| | | | | |
|---|---|---|---|---|
| 4,784,442 A | * | 11/1988 | Petersen ........................ | 303/15 |
| 5,500,944 A | * | 3/1996 | Yoshida ........................ | 714/47 |
| 5,572,187 A | * | 11/1996 | Williford ...................... | 340/454 |
| 5,752,748 A | * | 5/1998 | Schramm et al. ............. | 303/20 |
| 5,954,407 A | * | 9/1999 | Schramm et al. ........... | 303/155 |
| 5,961,190 A | * | 10/1999 | Brandmeier et al. ........ | 303/152 |
| 6,202,018 B1 | * | 3/2001 | Stumpe et al. ................ | 701/70 |
| 6,256,570 B1 | * | 7/2001 | Weiberle et al. .............. | 701/70 |
| 6,299,261 B1 | * | 10/2001 | Weiberle et al. .............. | 303/20 |
| 6,349,996 B1 | * | 2/2002 | Heckmann et al. ..... | 303/122.04 |
| 6,410,993 B1 | * | 6/2002 | Giers ........................ | 307/10.1 |
| 6,449,551 B1 | * | 9/2002 | Wrede ......................... | 701/70 |
| 6,628,993 B1 | * | 9/2003 | Bauer .......................... | 700/20 |
| 6,823,244 B2 | * | 11/2004 | Breed .......................... | 701/29 |
| 6,934,874 B2 | * | 8/2005 | Retter et al. .................. | 714/4 |
| 7,058,459 B2 | * | 6/2006 | Weiberle et al. .............. | 700/19 |

FOREIGN PATENT DOCUMENTS

| | | |
|---|---|---|
| DE | 198 26 130 | 12/1999 |
| DE | 198 26 131 | 12/1999 |
| DE | 198 26 132 | 12/1999 |
| DE | 198 61 144 | 5/2000 |

* cited by examiner

*Primary Examiner*—Robert W. Beausoliel
*Assistant Examiner*—Elmira Mehrmanesh
(74) *Attorney, Agent, or Firm*—Kenyon & Kenyon LLP

(57) ABSTRACT

A method of mutual monitoring of components of a distributed computer system for a safety-relevant application in a motor vehicle in particular. The components are interconnected by at least one communication system. To make the mutual monitoring of components as simple and comprehensible as possible and to save on additional hardware components for monitoring, in a plurality of components of the computer system an internal monitoring function which detects faults in the monitored component and a mutual monitoring function which performs a mutual check on results determined by the components and makes a majority selection from the results are implemented, and both the result of the internal monitoring function and the results of the mutual monitoring functions are taken into account in a decision as to whether there is a fault in a component.

17 Claims, 6 Drawing Sheets

Fig. 5

|  |  | RM$_1$ | RM$_2$ | RM$_3$ | RM$_4$ |
|---|---|---|---|---|---|
| $t_0$ |  | $S_1(t_0)$ |  |  |  |
|  |  | $E_1[S_1(t_0)]$ | $E_2[S_1(t_0)]$ | $E_3[S_1(t_0)]$ |  |
|  | $S_1(t_0)$ |  |  |  |  |
|  | $E_1[S_1(t_0)], E_2[S_1(t_0)], E_3[S_1(t_0)]$ | $V_{112}, V_{113}, V_{123}$ | $V_{212}, V_{213}, V_{223}$ | $V_{312}, V_{313}, V_{323}$ |  |
|  |  | $H_{11}, H_{12}, H_{13}$ | $H_{21}, H_{22}, H_{23}$ | $H_{31}, H_{32}, H_{33}$ |  |
|  | ... |  |  |  |  |
| $t_1$ |  |  | $S_2(t_1)$ |  |  |
|  |  |  | $E_2[S_2(t_1)]$ | $E_3[S_2(t_1)]$ | $E_4[S_2(t_1)]$ |
|  | $S_2(t_1)$ |  |  |  |  |
|  | $E_2[S_2(t_1)], E_3[S_2(t_1)], E_4[S_2(t_1)]$ |  | $V_{223}, V_{224}, V_{234}$ | $V_{323}, V_{324}, V_{334}$ | $V_{424}, V_{434}, V_{444}$ |
|  | ... |  |  |  |  |

Fig. 6

| | RM1 | RM2 | RM3 | RM4 |
|---|---|---|---|---|
| $t_0$ | $F_k(t_0)$ | | | |
| | | | | |
| | $L_1[F_k(t_0)]$ | $L_2[F_k(t_0)]$ | $L_3[F_k(t_0)]$ | $L_4[F_k(t_0)]$ |
| $L_1, L_2, L_3, L_4$ | $C_{11}, C_{12}, C_{13}, C_{14}$ | $C_{21}, C_{22}, C_{23}, C_{24}$ | $C_{31}, C_{32}, C_{33}, C_{34}$ | $C_{41}, C_{42}, C_{43}, C_{44}$ |
| ... | ... | ... | ... | ... |
| $t_1$ | | $F_r(t_0)$ | | |
| $F_r(t_0)$ | | | | |
| | $L_1[F_r(t_0)]$ | $L_2[F_r(t_0)]$ | $L_3[F_r(t_0)]$ | $L_4[F_r(t_0)]$ |
| $L_1, L_2, L_3, L_4$ | $C_{11}, C_{12}, C_{13}, C_{14}$ | $C_{21}, C_{22}, C_{23}, C_{24}$ | $C_{31}, C_{32}, C_{33}, C_{34}$ | $C_{41}, C_{42}, C_{43}, C_{44}$ |

METHOD FOR MUTUAL MONITORING OF COMPONENTS OF A DISTRIBUTED COMPUTER SYSTEM

FIELD OF THE INVENTION

The present invention relates to a method for mutual monitoring of components of a distributed computer system for a safety-relevant application, in particular in a motor vehicle. The components are interconnected via at least one communication system.

The present invention also relates to a computer program for implementation of mutual monitoring of components of a distributed computer system for a safety-relevant application in a motor vehicle in particular. The computer program here is capable of running on a computing element, in particular on a microprocessor.

The present invention additionally relates to a control unit for a component of a distributed computer system including a plurality of components for a safety-relevant application in a motor vehicle in particular.

Finally, the present invention also relates to a distributed computer system including a plurality of components for a safety-relevant application in a motor vehicle in particular. The computer system includes at least one communication system by which the components are interconnected.

BACKGROUND INFORMATION

Distributed computer systems having a plurality of components for an electronic brake system (brake-by-wire) in a motor vehicle are described in German Patent Application No. 198 26 130, German Patent Application No. 198 26 131, German Patent Application No. 198 26 132, and German Patent Application No. 198 61 144. However, uses of such computer systems and methods of mutual monitoring of components of such computer systems are not limited to use in motor vehicles. Instead, they may be used for any safety-relevant applications, e.g., in land vehicles, rail vehicles or aircraft, for example. Safety-relevant applications are applications in which fault-free output of at least one variable is absolutely essential.

In addition to an electronic brake system, it is also possible to use such computer systems in electronic steering systems (steer-by-wire) or other x-by-wire systems, where the function of a mechanical connection is taken over exclusively by electric and electronic components. Another typical application for the computer system of the aforementioned type in a motor vehicle is use in an engine controller for camshaft-free actuation of intake and exhaust valves.

The electronic brake system described in the applications cited above has wheel brakes having an electromechanical actuation. A central control unit is used to provide setpoint values for the individual wheel brakes. To permit reliable operation of the control unit and secure monitoring of the components, the control unit is equipped with a redundant computing element and an additional monitoring unit, in addition to the actual computing element for calculation of the setpoint values. This implementation in the circuitry and a mutual monitoring strategy of the computing elements contained in the control unit based on a question-response communication permit a reliable means of providing setpoint variables for activation of the wheel brakes.

The central control unit delivers the setpoint variables to electronic control units via at least one communication system, these being distributed control units located on site in the vicinity of the wheel brakes. The control units cause actuation of the brake shoes by electric motors and tightening of the brake disks on the individual wheels as a function of the setpoints. Reliable triggering of the electric motors is achieved by an additional monitoring module provided on each control unit, detecting potential faults in the monitored control unit on the basis of a coordinated question-response communication, actuating a shutdown path if necessary.

In addition, self-test routines are implemented in the control units, permitting fault recognition to a certain extent. These self-test routines may be referred to as internal monitoring functions which detect faults in the monitored control unit. To ensure the operating functionality of the control units, two independent power sources are provided to supply power to the individual electric components. Individual electric components are supplied with power either from both power sources or from only one power source at a time to maintain at least partial operation of the electric brake system in the event of failure of one power source.

It has proven to be a disadvantage of the conventional computer systems and the conventional method of mutual monitoring of components of the computer systems that a relatively great complexity is required in terms of hardware and software to meet the high reliability requirements. On the other hand, for understandable reasons, it is not readily possible to simply lower the safety requirements in the case of safety-relevant applications.

SUMMARY

One object of the present invention is to be able to implement monitoring of components of a distributed computer system for a safety-relevant application using a lower complexity while retaining existing safety requirements.

According to example embodiments of the present invention, in a plurality of components of the computer system, an internal monitoring function which detects faults in the monitored component and a mutual monitoring function which performs a mutual check on results determined by the components and makes a majority selection from the results are implemented, and both the result of the internal monitoring function and the result of the mutual monitoring functions are taken into account in a decision regarding whether there is a fault in a component.

In an example method according to the present invention, a plurality of components of the computer system, preferably all the components of the computer system, have an internal monitoring function. The example method according to the present invention is used in particular in computer systems having a plurality of components of the same type. Components of the same type may be, for example, wheel modules of an electronic brake system or an electronic steering system, valve modules of an engine controller for camshaft-free actuation of intake and exhaust valves or the like.

The internal monitoring function detects faults in the components monitored, preferably in the hardware of a computing element, in particular a microprocessor of the component monitored. The internal monitoring function may be implemented in a variety of ways, e.g., by a computer program or program module which checks on certain functions of the component, preferably the computing element of the component.

Furthermore, a mutual monitoring function is also provided in a plurality of components of the computer system, preferably in all components of the computer system. With the help of the mutual monitoring function running on one component, it is possible to check on proper functioning of the other components of the computer system. A plurality of components in each case preferably monitors one component for proper functioning.

Following this, the other components of the computer system are also monitored in succession. As part of the mutual monitoring, the monitoring components thus alternate with the monitored components, so that after a certain monitoring time, all the components to be monitored have in fact been monitored at least once.

Preferably always a plurality of components check on proper functioning of a component of the computer system. If the monitored and monitoring components all yield the same result as the result of a certain calculation, then proper functioning of the monitored components is ensured. Detection of a faulty component becomes more relevant when the components to be monitored and/or one or more of the monitoring components supply different results. The results of the components are then processed so that it is possible to ascertain which results are correct and which are incorrect and which components are functioning without a fault and which components are faulty. To this end, the results determined by the monitoring components are checked to the extent that a majority selection is made from the results to detect the faulty component. To obtain the most reliable possible monitoring result, the result of the internal monitoring function of the components as well as the results of the mutual monitoring functions are taken into account in the decision as to whether or not there is a fault in a component.

It is to be expected that in the future there will be a drastic increase in the number of distributed computer systems for safety-relevant applications, in particular in motor vehicles. For this reason, the present invention may be particularly relevant, because through the present invention, it is possible to meet high safety requirements for distributed computer systems with markedly reduced complexity and without any sacrifice of safety. Therefore, it is possible to save on costs in the design and production of such computer systems while on the other hand it is possible to implement the monitoring sequences for monitoring fault-free operation of the components of the computer system much more simply and thus also more transparently—which is even more important with the safety-relevant applications in question here. Therefore, it is possible to simplify the design and implementation of the monitoring functions of components of a distributed computer system while also greatly reducing the susceptibility of the monitoring method to faults because of a faulty design or a faulty implementation.

According to an advantageous refinement of the present invention, the internal monitoring function recognizes the faults in the monitored components by checking on basic operations of a set of commands of a computing element, in particular a microprocessor, of the component. Basic operations monitored as part of the internal monitoring function include, e.g., addition, multiplication, shift function, etc.

According to a preferred embodiment of the present invention, the components receive signals from external units, in particular from sensors, and process them further, and as part of the internal monitoring function, the external units of the monitored component are also monitored. For example, a plausibility check or gradient monitoring of signals received from the sensors may be used as the basis for monitoring the external units.

According to another preferred embodiment of the present invention, the mutual monitoring functions use model calculations to check on the results determined by the components. Typical examples of a model calculation on the example of an electronic brake system include a simple calculation of wheel slip on the basis of rotational speed signals, calculation of the reference speed from rotational speed signals or calculation of a braking force distribution from existing signals.

The determination of results in the components is advantageously performed by calculations based on selected data made available by one component to each of the other components. The selected data is preferably made available by one component to each of the other components in alternation. Then all the components of the computer system gradually make the data which forms the basis for the model calculations available to the other components, one after the other. The selected data is made available by the particular component to the other components via the communication system.

According to yet another preferred embodiment of the present invention, the determination of results in the components is performed by calculation of responses to a predefinable question as part of a question-response communication, the questions each being supplied by one component to the other components. Thus in this embodiment, questions, rather than data, are supplied. To this end, a different set of questions is stored in each component. In addition, the correct response to each question is also stored in the components. As part of the question-response communication, one component sends a question to the other components at a definable point in time. The question must be answered correctly by the monitored component and by the other monitoring components within a predefinable interval of time. For a correct response to a question, different partial responses are formed, being derived from, e.g., a correct run-through of safety-relevant program parts using a predefinable data record or from a fault-free sequence of programs for a function test and a command test for a computing element of a component. The partial responses are combined in each component to form an overall response, which is sent back to the monitoring component as the response to the question.

The questions are advantageously made available by one particular component to the other components in alternation. This ensures that each component of the computer system will be monitored at regular time intervals. The questions are preferably made available by one particular component to the other components via the communication system. Likewise, the responses to the questions are transmitted by the components, preferably via the communication system, to the component asking the questions.

An implementation of the method according to the present invention in the form of a computer program capable of running on a computing element, in particular on a microprocessor, and suitable for execution of the method according to the present invention may be particularly important. In this example, the present invention is implemented by a computer program, so that this computer program constitutes the present invention in the same way as does the method which the computer program is suitable for executing. It is preferable if the computer program is stored on a memory element, in particular on a read-only memory, a random-access memory or a flash memory.

As another implementation of the present invention, based on the control unit for a distributed computer system of the type defined in the preamble, the control unit in a plurality of components controls an internal monitoring function which detects faults in the component monitored and a mutual monitoring function which performs a mutual check on results determined by the components and makes a majority selection from the results, and the control unit takes into account the result of the internal monitoring function as well as the results of the mutual monitoring functions in a decision regarding whether or not there is a fault in a component.

According to an advantageous refinement of the present invention, the control unit has means for executing this method according to the present invention.

In yet another implementation of the present invention, based on the distributed computer system of the type defined in the preamble, an internal monitoring function in a plurality of components detects faults in the monitored component and a mutual monitoring function is implemented, performing a mutual check on results determined by the components and making a majority selection from the results, and the computer system has means for deciding whether or not there is a fault in a component, taking into account the result of the internal monitoring function as well as the results of the mutual monitoring functions.

According to an advantageous refinement of the present invention, the computer system has means for executing the method according to the present invention.

BRIEF DESCRIPTION OF THE DRAWINGS

Additional features, possible applications and advantages of the present invention are derived from the following description of exemplary embodiments of the present invention, which are illustrated in the drawing. All the features illustrated or described here constitute the object of the present invention, either alone or in any combination, regardless of how they are formulated in the description or depicted in the drawing.

FIG. 5 shows a table illustrating the sequence of mutual monitoring using selected data.

FIG. 6 shows a table to illustrate the sequence of mutual monitoring using a question-response communication.

DESCRIPTION OF EXAMPLE EMBODIMENTS

The present invention relates to a method of mutual monitoring of the components of a distributed computer system. This mutual monitoring may be important in the case of safety-relevant applications in particular, i.e., in systems in which fault-free output of at least one variable is required. A typical application is for electric brake systems in motor vehicles (brake-by-wire). The following discussion is based on an electric brake system using a distributed computer system. However, the present invention is not limited to such electric brake systems.

Figure 1:
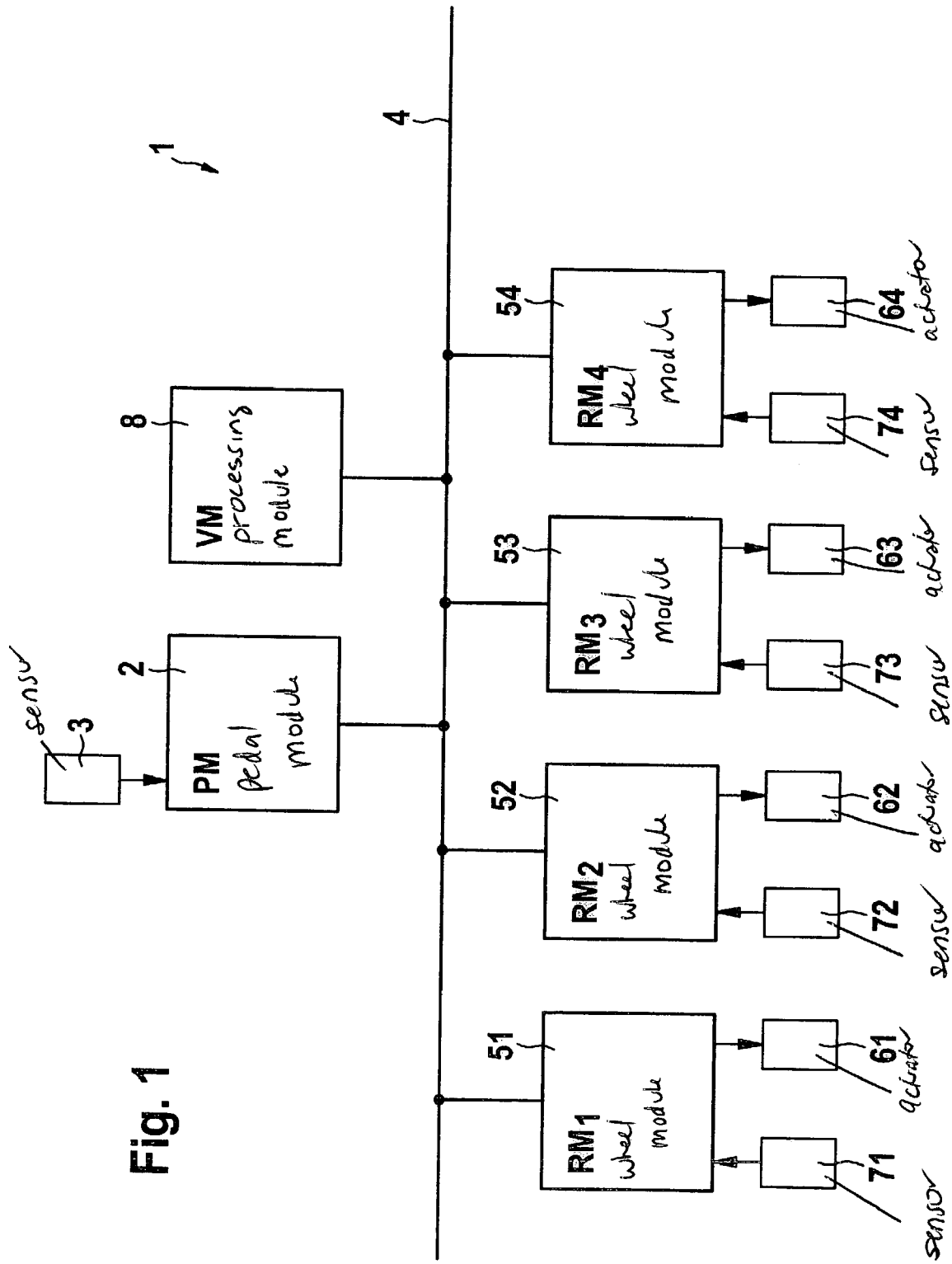
FIG. 1 shows a distributed computer system according to the present invention using the example of an electric brake system according to a first preferred embodiment.

The structure of the electric computer system according to the present invention is illustrated in FIG. 1 using the example of an electric brake system. Computer system 1 includes a pedal module (PM) 2 in which sensors 3 detect the intent of a driver of the vehicle with respect to use of the service brakes and also with respect to use of the parking brake or emergency brake. The driver's intent thus detected is used to calculate reference input variables (setpoints) for regulating the braking forces and transmitted via a communication system 4, which is designed as a reliable redundant bus system. Pedal module 2 is implemented in the form of two or three independent computing elements and also contains a redundant component for signal detection.

The components of computer system 1 shown in FIG. 1 are designed as wheel modules RM_1 through RM_4 51 through 54. Actuating signals for electric actuators 61 through 64 are calculated in wheel modules 51 through 54 for regulating the braking forces, i.e., the braking torques for the individual wheels of the motor vehicle, and the signals are output to actuators 61 through 64. To do so, the required signal values from sensors 71 through 74 such as the brake application force or braking torque, angle of rotation or the position of electric brake control unit 61 through 64 are detected and processed in wheel modules 51 through 54. In a processing module VM 8, higher-order brake functionalities such as the ABS brake system or the electronic stability program (ESP) are implemented.

Figure 2:
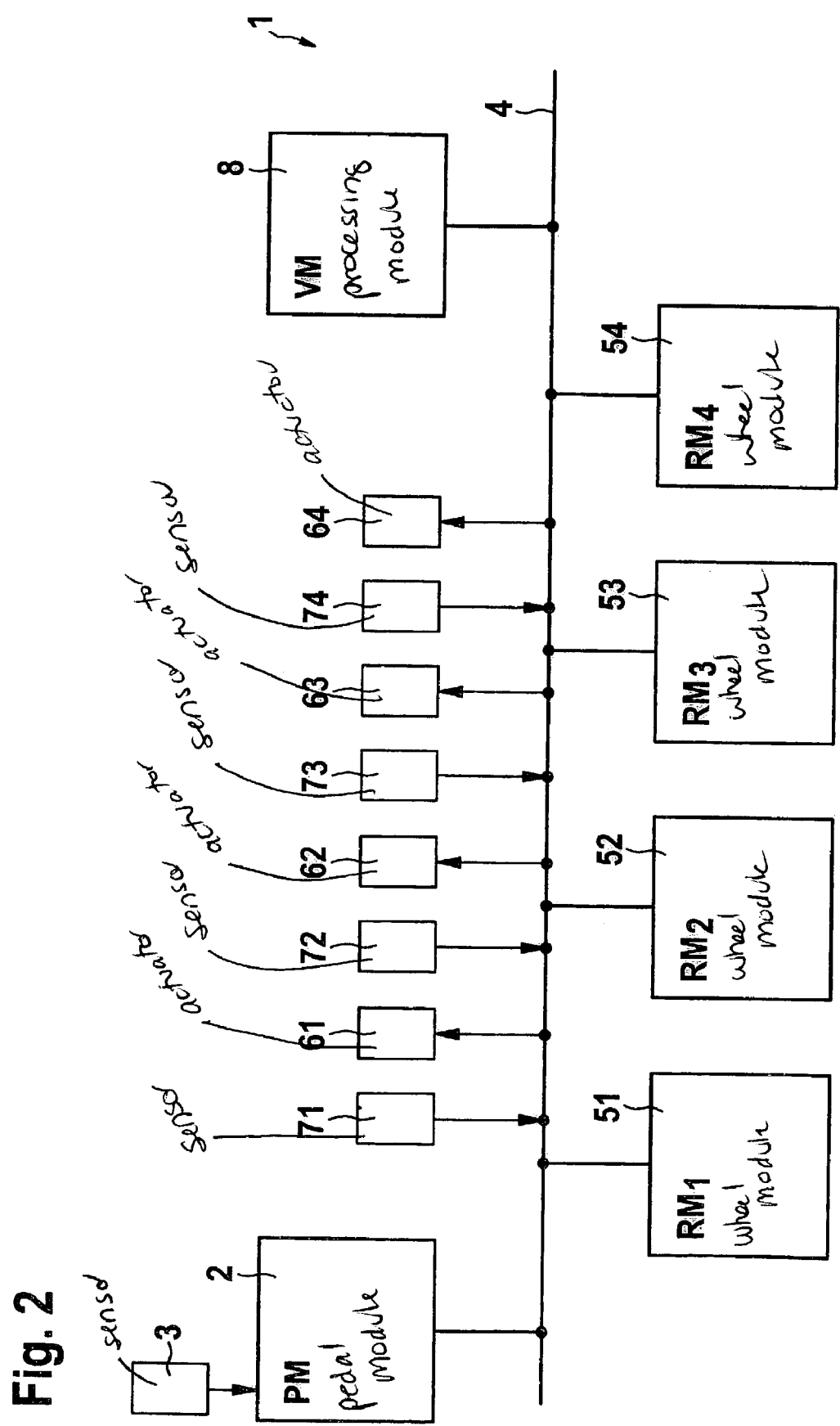
FIG. 2 shows a distributed computer system according to the present invention using the example of an electric brake system according to a second preferred exemplary embodiment.

In contrast with the computer system illustrated in FIG. 1, where sensors 71 through 74 detect the sensor signals locally and relay them directly to wheel modules 51 through 54, the sensor signals detected are globally available via communication system 4 in the case of computer system 1 of FIG. 2. Likewise, actuators 61 through 64 are globally controllable via communication system 4. The embodiment of computer system 1 illustrated in FIG. 2 has the advantage that in the event of a defect in one of wheel modules 51 through 54, it is not simply shut down for safety reasons, but instead any other intact wheel module may assume the function of the defective wheel module, and triggering signals for the particular actuators assigned to the defective wheel module are calculated on the basis of sensor signals from the sensor assigned to the defective wheel module, these triggering signals being relayed to the actuator via communication system 4 for triggering the actuator.

Figure 3:
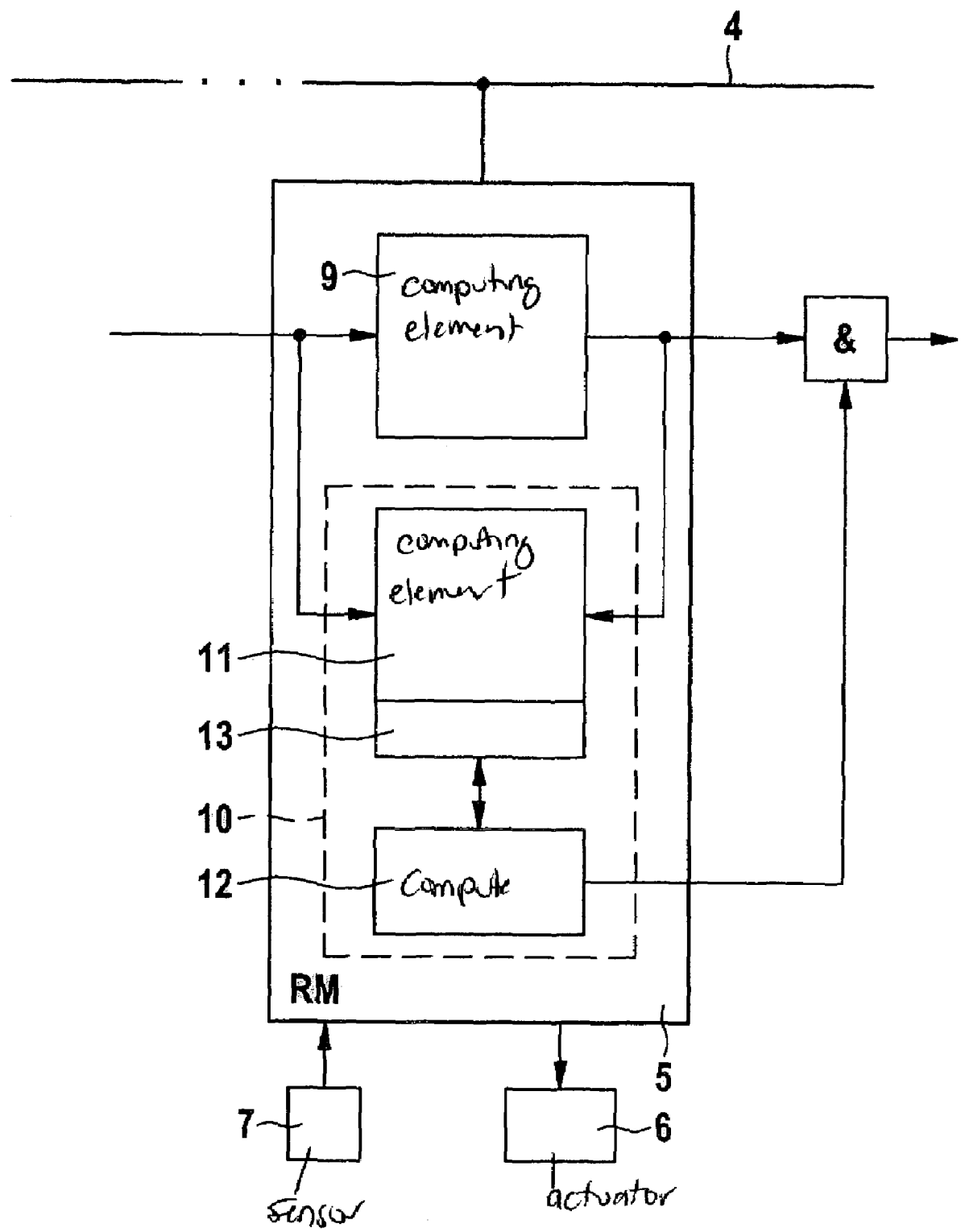
FIG. 3 shows a component of a distributed computer system known from the related art using the example of a wheel module of an electric brake system.

FIG. 3 shows a wheel module (RM5) of a conventional electric brake system. Wheel module 5 has a distributed computing element 9 designed as a microprocessor in particular for executing the intended function of wheel module 5. As explained above, the intended function of wheel module 5 is generally to detect and process sensor signals from a sensor 7, and to generate a triggering signal to trigger an actuator 6 and to relay the signal to this actuator. To monitor computing element 9, an additional monitoring module 10 is used with wheel module 5, which is conventional, this additional monitoring module permitting reliable shutdown of the faulty wheel module 5 in the event of a fault in one of wheel modules 5, the shutdown being implemented on the basis of a question-response communication and including a particular assigned shutdown path. Monitoring module 10 includes another computing element 11 which generally performs the same calculation as computing element 9. Computing element 11 may also form a unit with computing element 9, in which case the functional division remains the same as described above. The results of computing element 9 and computing element 11 calculated as part of the execution of the intended function of wheel module 5 are compared in computing element 11. As soon as there is a deviation in the results of computing elements 9 and 11, wheel module 5 is shut down for safety reasons.

In addition, another computer 12 is also provided for a question-response communication for monitoring the function of computing element 11. Computer 12 asks selected questions of computing element 11, and these questions are answered by an area 13 of computing element 11. The triggering signal for actuators 6 calculated by computing element 9 is relayed to these actuators only if the computing element gives the correct response to the question posed by computer 12 within a predefinable interval of time. This additional monitoring module may be omitted in the method of mutual monitoring of the wheel modules according to the present invention.

Figure 4:
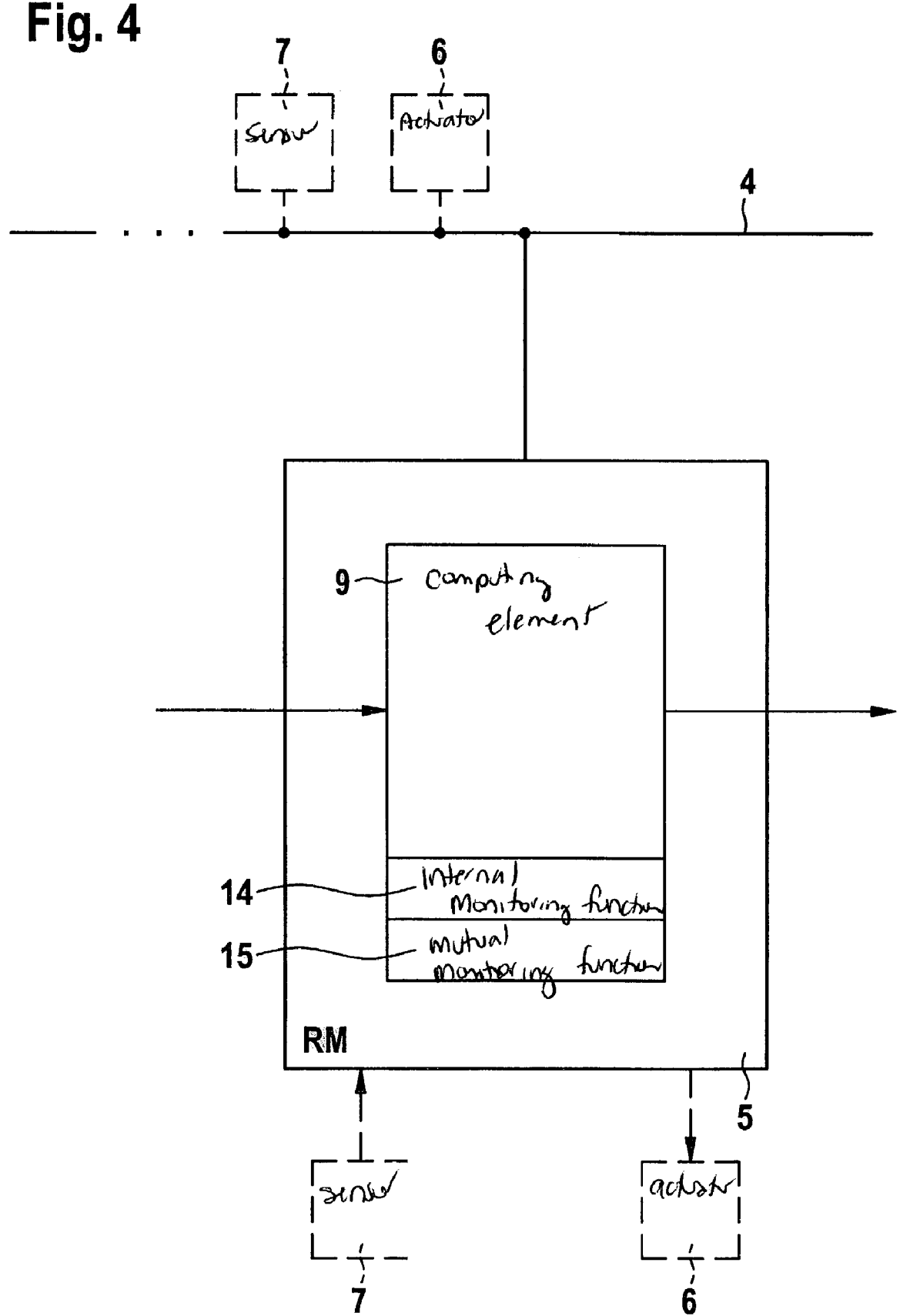
FIG. 4 shows a component of a distributed computer system according to the present invention using the example of a wheel module of an electric brake system.

FIG. 4 shows a wheel module 5 of a computer system 1 according to the present invention. In the case of wheel module 5 of computer system 1 according to the present invention, the entire monitoring module 10 shown in FIG. 3 is omitted. There is only one computing element 9 to perform the intended function of wheel module 5. One area of computing element 9 is used to perform an internal monitoring function 14 and another area is used to perform a mutual monitoring function 15. The internal monitoring function and mutual monitoring function 15 are explained in greater detail below. Sensors 7 and actuators 6 are connected to wheel module 5 either directly or indirectly via communication system 4.

Each computing element 9 of a wheel module 5 includes an internal monitoring function 14, which detects faults in a particular computer hardware unit 9 and sensor system 7. Computer hardware unit 9 is monitored by using computer programs to check on basic operations of a computer operations set of computing element 9 such as addition, multiplication, shift function and others. For example, a plausibility check or gradient monitoring of received sensor signals may be used as the basis for monitoring sensor system 7. The result of internal monitoring 14 of a wheel module $RM\_i$ is converted into a logic variable $B\_i$. For this logic variable $B\_i$ it holds that:

$$B_i = \begin{cases} 1 & \text{if an internal fault is detected} \\ 0 & \text{if no internal fault is detected} \end{cases} \quad (1)$$

Internal monitoring functions 14 are unable to detect all faults occurring in wheel modules 5, so another monitoring function, mutual monitoring function 15, is introduced. Two different embodiments of mutual monitoring 15 are described in detail below.

First, a mutual monitoring function is described on the basis of selected data. Generally, mutual monitoring functions 15 are active in three of four wheel modules 5 at any point in time during operation of wheel modules 5. By using model calculations, wheel modules 5, which are involved in the monitoring, check on their results mutually and are thus able to make a majority selection (2 out of 3). These calculations are performed using selected data provided alternately by one wheel module 5 to the other wheel modules via communication system 4.

Data provided by one wheel module $RM\_i$ at a point in time $t\_x$ is referred to as $S\_i\,(t\_x)$. The result of a model calculation performed in a wheel module $RM\_j$ using data $S\_i\,(t\_x)$ is given as $E\_j\,[S\_i\,(t\_x)]$, where $i=1 \ldots 4$. The model calculations used for determining the result $E\_j\,[S\_i\,(t\_x)]$ are representative with regard to the calculations which are used for the intended functioning of wheel module $RM\_i$, i.e., in these model calculations, the same supply of commands of computing element 9 is used, the same program sequence is followed and the same memory areas are addressed. Three variants are possible with respect to the structure of data $S\_i\,(t\_x)$:

(a) The data includes both updated data detected by sensor system 7 of wheel module 5 and processed operands typical of the method.

(b) The data contains specially prepared and stored values which occur representatively as sensor values and/or as processed computational variables in implementation of the intended function within wheel module 5.

(c) The data is selected randomly at a point in time $t\_x$ from a value range which occurs typically during operation in processing of the intended function of wheel module 5.

Typical examples of the model calculation $E\_j\,[S\_i\,(t\_x)]$ include:

calculation of wheel slip on the basis of rotational speed signals;

calculation of a reference speed from rotational speed signals;

calculation of a braking force distribution from available signals.

In a preferred implementation variant, the number of modules involved in monitoring is limited to wheel modules 5. In deviation from this, it is possible for other modules of computer system 1 in addition to wheel modules 5 to be involved in the monitoring. In particular, pedal module PM2 and/or processing module VM8 could also be included in the monitoring, or at least in the event of failure of a wheel module 5, take over its calculations for mutual monitoring function 15. Including pedal module 2 and/or processing module 8 may be problematic with regard to a desired modular structure made up of components of the same type of the electric brake system.

Mutual monitoring 15 rotates over participating wheel modules 5 as time t advances. To illustrate this, Table 1 below illustrates one cycle of mutual monitoring 15. For monitoring of a wheel module 5, two other wheel modules 5 are tied in. The number of participating modules here is n=3.

TABLE 1

| Time | Data for mutual monitoring | Wheel modules involved in the mutual monitoring | | |
|---|---|---|---|---|
| t_0 | S_1 (t_0) | RM_1 | RM_2 | RM_3 |
| t_1 | S_2 (t_1) | RM_2 | RM_3 | RM_4 |
| t_2 | S_3 (t_2) | RM_3 | RM_4 | RM_1 |
| t_3 | S_4 (t_3) | RM_4 | RM_1 | RM_2 |
| t_4 | S_1 (t_4) | RM_1 | RM_2 | RM_3 |
| . . . | . . . | . . . | . . . | . . . |

Mutual monitoring 15 of wheel modules $RM\_1$, $RM\_2$ and $RM\_3$ beginning at time $t\_0$ is considered below as an example. To do so, data $S\_1\,(t\_0)$ is supplied to other wheel modules 5 via communication system 4. Model calculations are then performed in participating wheel modules 5 using data $S\_1\,(t\_0)$. Results $E\_j\,[S\_1\,(t\_0)]$, wherein $j=1 \ldots n$ and $n \geq 3$ resulting from these calculations, are then exchanged mutually via communication system 4 and compared in each participating wheel module 5. Logic comparison variables $V\_kji$ are formed as a result of this comparison. A logic comparison variable xxx calculated in wheel module $RM\_k$ taking into account results $E\_j\,[S\_1\,(t\_0)]$ and $E\_i\,[S\_1\,(t\_0)]$ is referred to below as $V\_kji$ and is defined by the equation:

$$V_i = \begin{cases} 0 & \text{if } |E_j[S_1(t_0)] - E_i[S_1(t_0)]| \leq \varepsilon \\ 1 & \text{if } |E_j[S_1(t_0)] - E_i[S_1(t_0)]| > \varepsilon \end{cases} \quad (2)$$

where k, j, i∈[1 . . . n] and i≠j.

ε denotes a fault tolerance, which may also assume a value 0. Index k of logic comparison variables V_kji indicates which wheel module 5 performs the comparison. Index j denotes the first value of the comparison, and index i denotes the second value. This yields a simplified calculation V_kji=V_kij on the basis of the symmetrical structure of the electric brake system.

Fixedly defined accuracy rating ε takes into account admissible tolerances between the calculations in various wheel modules 5. In each wheel module 5 participating in monitoring 15, auxiliary logic variables H_ki are calculated from these logic comparison variables V_kji. An auxiliary variable calculated in wheel module RM_k containing information about the correctness of the calculation in wheel module RM_i is referred to below as H_ki. If we consider a number n of wheel modules 5 participating in monitoring 15, then auxiliary logic variables H_ki are defined by the following logic AND link of (n−1) comparison variables V_kji:

$$H_{ki} = \prod_{j=1, j\neq i}^{n} V_{kji} \quad (3)$$

Index k of auxiliary logic variables H_ki here corresponds to wheel module 5 in which the calculation is performed, and index i corresponds to wheel module 5 which was checked. In an expanded implementation variant having more than three wheel modules involved in mutual monitoring 15, determination of auxiliary logic variable H_ki may be limited to a logic AND link having two comparison variables V_kji.

A shutdown of variables triggered by wheel module RM_i is performed by a logic variable A_i which is given by the following boolean equation at a number n of wheel modules 5 in question:

$$A_i = B_i \vee H_{ii} \vee \prod_{j=1, j\neq i}^{n} H_{ij} \quad (4)$$

In equation (4), B_i v H_ii corresponds to internally detected faults in wheel module RM_i. However, the product of auxiliary variables H_ij corresponds to faults of wheel module RM_i determined by external wheel modules. In equation (4), v characterizes an OR link. This equation shows that a shutdown signal A_i is triggered for the variables triggered by wheel module RM_i either if wheel module RM_i is detected by internal monitoring 14 or a fault state is detected by the comparison calculations or if additional wheel modules 5 (n−1) participating in mutual monitoring 15 all detect a fault. If n>3 modules are included in mutual monitoring 15 in an expanded implementation variant, then the following equation may be used instead of equation (4) as the equation for shutdown of the variables triggered by wheel module RM_i:

$$A_i = B_i \vee H_{ii} \vee \Omega_i \quad (5)$$

where Ω_i describes a selection (2 out of k), (majority selection) with respect to logic variables H_ij, where 3≦k≦n−1; i, j∈[1 . . . n] and j≠i.

Because of the high potential risk of an unauthorized shutdown of variables of one or more wheel modules 5, the implementation of the function described by equations (4) and/or (5) should be designed to be very secure. This function is implemented on two shutdown paths for each wheel module RM_i. The first shutdown path implements the condition A_i1=B_i v H_ii and is performed by wheel module RM_i. This is the internal shutdown path of wheel module RM_i. The second shutdown path (external shutdown path) implements linkage A_i2 with the product via auxiliary variables H_j in equation (4) or the condition A_i2=Ω_i in equation (5). For each wheel module RM_i this requires means capable of receiving required logic variables H_ij from participating wheel modules 5 and of processing them according to the logic linkages. The result of this processing then allows an independent shutdown of variables triggered by wheel module RM_i. This external shutdown path may be implemented, e.g., via intelligent communication controllers over which the computing elements of the individual wheel modules are connected to the communication system. These communication controllers then also assume the function of monitoring the other wheel modules in addition to connecting the computing element to the communication system.

Due to the revolving sequence, mutual monitoring 15 may also be implemented even in the case when a wheel module 5 is detected as defective or not present. In this case, only properly functioning modules are used by a reconfiguration for the conditions defined above.

The program sequence of wheel modules 5 involved in mutual monitoring may be synchronized by using a time-controlled bus as communication system 4, i.e., using a global system time. This requires that each task take place in a fixed time frame. Consequently, a minimum running time and a maximum running time are specified for each task to ensure the specific sequence of previously defined tasks within a cycle. Model calculations and comparison calculations for mutual monitoring 15 may also be performed as synchronized tasks. The chronological and functional sequence of mutual monitoring 15 of wheel modules RM_1, RM_2 and RM_3 is illustrated in the table in FIG. 5.

As another embodiment of mutual monitoring, the check on correct functioning of a wheel module RM_i on the basis of a question-response communication is described in detail. In this embodiment, the check on proper functioning of a wheel module RM_i is supported by the other wheel modules RM_j. Number n of wheel modules 5 involved in this monitoring is n≧3. The monitoring variant according to this embodiment has generally the same sequence as the monitoring variant described above on the basis of selected data. However, instead of data S_i (t_x), questions are supplied in the present embodiment. To this end, a different set of questions F_k, wherein k=1 . . . r, is stored in each wheel module RM_j involved in mutual monitoring 15. In addition, correct response W_k, where k=1 . . . r, is also stored for each question F_k in wheel modules RM_j. In the embodiment described here, the check is implemented by a question-response communication. Wheel module RM_j sends a question F_k (t_x) at a predefinable point in time t_x to all other wheel modules RM_1 involved in mutual monitoring 15. This question should be answered correctly by the sending wheel module RM_j and all other wheel modules RM_i involved in the monitoring. To answer the different questions, partial answers are formed in each case, e.g., as the result of a correct execution of safety-relevant program parts using a defined data record or a fault-free sequence of a computer program for the computer function test and the command test.

The partial responses formed from the subprograms are combined in all n wheel modules RM_i involved in the monitoring to form a complete response. The response to question F_k (t_x) calculated in a wheel module RM_i is referred to below as L_i (F_k), where i=1 . . . n. Each wheel module RM_i transmits response L_i (F_k) thus determined to all other wheel modules 5 involved in the monitoring. In wheel module RM_i and in the other wheel modules RM_j involved, a response L_i (F_k) is checked for accuracy with regard to the interval of time for arrival of the response and for matching the correct response W_k assigned to the question. A faulty function of wheel module RM_j detected in wheel module RM_i is characterized by a logic variable C_ij which is defined as follows:

$$C_{ij} = \begin{cases} 0 & \text{if} |L_i[F_k(t_0)] - W_k| \le \varepsilon \\ 1 & \text{if} |L_i[F_k(t_0)] - W_k| > \varepsilon \end{cases} \quad (6)$$

where j, i∈[1 . . . n].

A shutdown of variables triggered by wheel module RM_i is accomplished through logic variable A_i, which is given by the following boolean equation in the case of a number n of wheel modules 5 taken into account:

$$A_i = B_i \vee C_{ii} \vee \prod_{j=1, j \ne i}^{n} C_{ji} \quad (7)$$

In an implementation variant having more than three wheel modules 5 involved in mutual monitoring 15, the logic AND link in equation (7) may be limited to two logic variables C_ij, or the following equation may be used instead of equation (7):

$$A_i = B_i \vee C_{ii} \vee \Omega_i \quad (8)$$

where Ω_i describes a (2 out of k) selection with respect to logic variable C_ji, where i, j∈[1 . . . n] and j≠i.

Again in this second embodiment, condition A_i1=B_i v C_ii implements a separate shutdown path, which is performed by wheel module RM_i. The product of logic variables C_ji and/or the (2 of k) selection Ω_i describes an external shutdown path A_i2 which is performed by wheel modules RM_j monitoring wheel module RM_i.

FIG. 6 shows the time sequence of mutual monitoring function 15 based on a question-response communication.

In summary, as a result of the present invention, it is not necessary to use additional hardware components for monitoring the computer components of a distributed computer system. The hardware required for monitoring by the method according to the present invention is determined only by the decentralized distribution of components which is required from function considerations. Due to the mutual monitoring presented here, an unambiguous localization of faulty components is made possible along with their shutdown via two separate shutdown paths.

What is claimed is:

1. A method for mutual monitoring of components of a distributed computer system for a safety-relevant application in a motor vehicle, the components being interconnected by at least one communication system, comprising:

performing, in each of a plurality of components of the computer system, an internal monitoring function which detects faults the component, and a mutual monitoring function, which performs a mutual check on results which have been determined by the plurality of components and makes a majority selection from the results of the mutual monitoring; and determining whether there is a fault in a monitored component as a function of both a result of the internal monitoring function and the results of the mutual monitoring functions.

2. The method as recited in claim 1, wherein the internal monitoring function detects the fault in the component by checking basic operations of a set of commands of a computing element of the component.

3. The method as recited in claim 2, wherein the computing element is a microprocessor.

4. The method as recited in claim 1, further comprising:
receiving, by the components, signals from external units;
processing, by the components, the received signals; and
monitoring the external units as part of the internal monitoring function.

5. The method as recited in claim 1, wherein the mutual monitoring function of the components check the results of the mutual monitoring determined by the components on a basis of model calculations.

6. The method as recited in claim 5, wherein the results of the mutual monitoring are determined in the components by calculations based on selected process data, each being made available to the components by the monitored component.

7. The method as recited in claim 6, wherein the selected process data is made available by the monitored component to the other components in alternation.

8. The method as recited in claim 6, wherein the selected process data is made available by the component to the components via the communication system.

9. The method as recited in claim 1, wherein the results are determined in the components by calculation of responses to a predefinable question as part of a question-response communication, the question being made available in each case by one of the components to others of the components.

10. The method as recited in claim 9, wherein the question is made available by one particular one of the components to others of the components in alternation.

11. The method as recited in claim 9, wherein the question is in each case made available by one particular one of the components to others of the components via the communication system.

12. A storage medium storing a computer program for implementation of a mutual monitoring of components of a distributed computer system for a safety-relevant application in a motor vehicle, the computer program being capable of running on a computing element, when executed by the computing element, causing the computing element to perform a method comprising:

performing an internal monitoring function which detects faults the component, and a mutual monitoring function, which performs a mutual check on results which have been determined by other components of the distributed computer system and makes a majority selection from the results of the mutual monitoring; and determining whether there is a fault in a monitored component as a function of both a result of the internal monitoring function and the results of the mutual monitoring functions.

13. The storage medium as recited in claim 12, wherein the computer program is stored in a memory element, the memory element including one of a read-only memory, a random-access memory or a flash memory.

14. A control unit for a component of a distributed computer system having a plurality of components for a safety-relevant application in a motor vehicle, the control unit compnsing:

an internal monitoring function arrangement configured to perform an internal monitoring function which detects faults in the component, and a mutual monitoring function arrangement which performs a mutual check on results determined by the plurality of components and makes a majority selection from the results;

wherein the control unit takes into account a result of the internal monitoring function and the results of the mutual monitoring functions in the case of a decision regarding whether there is a fault in the component.

15. The control unit as recited in claim 14, wherein the internal monitoring function arrangement is configured to detect faults in the component by checking basic operations of a set commands of a computing element of the component.

16. A distributed computer system apparatus comprising:

a plurality of components for a safety-relevant application in a motor vehicle, each of the plurality of components including an internal monitoring function which detects faults in the component and a mutual monitoring function which performs a mutual check on results determined by the plurality components and makes a majority selection from the results;

at least one communication system apparatus by which the components are interconnected; and means for making a decision as to whether there is a fault in a component taking into account both a result of the internal monitoring function and the results of the mutual monitoring functions.

17. The computer system apparatus as recited in claim 16, wherein the internal monitoring function detects a fault in the component by checking basic operations of a set of commands of a computing element of the component.

* * * * *